Patented Jan. 6, 1942

2,268,662

UNITED STATES PATENT OFFICE 2,268,662

PRODUCTION OF MATT PHOTOGRAPHIC EMULSIONS

Julius Knoefel, Leverkusen-Wiesdorf, Germany, assignor, by mesne assignments, to General Aniline & Film Corporation, New York, N. Y., a corporation of Delaware No Drawing. Application December 14, 1938, Serial No. 245,671. In Germany December 16, 1937

8 Claims. (Cl. 95—7)

My present invention relates to improvements in producing matt photographic emulsions.

The best known matting agent for photographic layers is starch, but its use has disadvantages, for instance, the sedimentation of the starch in the molten photographic emulsion and the tendency of the finished paper to curve.

It has also been proposed to use cellulose as the matting agent for photographic emulsions. It has the advantage that the cellulose can be brought by mechanical or chemical means to the desired coarseness of grain which, however, is very wearisome and costly.

It is an object of my invention to provide a very easy and simple process of producing useful matting effects in photographic emulsions.

A further object of the present invention is to provide a process of producing matting effects by introducing into the emulsion layer an organic cellulose derivative.

A still further object of this invention is the provision of a photographic material comprising a light-sensitive emulsion layer containing an organic cellulose derivative in a finely dispersed form.

Other objects and advantages of my invention are apparent from the following disclosure and the subjoined claims.

The organic cellulose derivative is preferably added to the photographic emulsion in the form of an aqueous dispersion which may be produced by precipitating the organic cellulose derivative from its solution in an organic solvent. The degree of fineness of this dispersion may be varied within certain limits by the choice of solvent or by using mixtures of certain solvents. The organic cellulose derivatives have the advantage over starch as matting agents for photographic emulsions in that they do not settle and do not unfavorably affect the flatness of the paper sheet.

The following examples illustrate the invention:

(1) 100 grams of ethyl cellulose are dissolved in a mixture of 200 cc. of ethyl alcohol and 200 cc. of toluene. Into the solution there is caused to run gradually while continuously stirring 500 cc. of water, whereby a fine aqueous dispersion of ethyl cellulose is produced. This dispersion is added, for example to a molten gelatine silver halide emulsion, the degree of matting being regulated by the proportion of dispersion added.

(2) 300 grams of acetyl cellulose are dissolved in 1000 cc. of an organic solvent (for instance, cyclohexanone, dimethylphthalate or methylene-chloride with an addition of a slight amount of ethyl alcohol). Into the solution there is caused to run while stirring 1000 cc. of water.

(3) 300 grams of benzyl cellulose are dissolved in 1000 cc. of an organic solvent (for instance, toluene or benzene with a slight amount of ethyl alcohol). Into this solution there is caused to run while stirring 1000 cc. of water.

I claim:

1. A method of matting or delustering a light-sensitive silver halide gelatin emulsion which method comprises dissolving an organic cellulose derivative in an organic solvent therefor, by adding water to the resulting solution, while stirring to effect precipitation of the cellulose derivative in a colorless form, and adding the dispersion thus formed to a molten silver halide gelatin emulsion.

2. A method of matting or delustering a light-sensitive silver halide gelatin emulsion which method comprises dissolving ethyl cellulose in an organic solvent therefor, adding water to the resulting solution, while stirring to effect precipitation of the ethyl cellulose in a colorless form, and adding the dispersion thus formed to a molten silver halide gelatin emulsion.

3. A method of matting or delustering a light-sensitive silver halide gelatin emulsion which method comprises dissolving acetyl cellulose in an organic solvent therefor, adding water to the resulting solution, while stirring to effect precipitation of the acetyl cellulose in a colorless form, and adding the dispersion thus formed to a molten silver halide gelatin emulsion.

4. A method of matting or delustering a light-sensitive silver halide gelatin emulsion which method comprises dissolving benzyl cellulose in an organic solvent therefor, adding water to the resulting solution, while stirring to effect precipitation of the benzyl cellulose in a colorless form, and adding the dispersion thus formed to a molten silver halide gelatin emulsion.

5. A silver halide gelatin emulsion containing as a matting or delustering agent an organic cellulose derivative dispersed therein, and obtained in accordance with the method of claim 1.

6. A silver halide gelatin emulsion containing as a matting or delustering agent ethyl cellulose dispersed therein, and obtained in accordance with the method of claim 2.

7. A silver halide gelatin emulsion containing as a matting or delustering agent acetyl cellulose dispersed therein, and obtained in accordance with the method of claim 3.

8. A silver halide gelatin emulsion containing as a matting or delustering agent benzyl cellulose dispersed therein, and obtained in accordance with the method of claim 4.

JULIUS KNOEFEL.